(12) United States Patent
Ahuja et al.

(10) Patent No.: US 10,082,866 B2
(45) Date of Patent: Sep. 25, 2018

(54) GAZE POINT DETECTION USING DYNAMIC FACIAL REFERENCE POINTS UNDER VARYING LIGHTING CONDITIONS

(71) Applicant: International Business Machines Corporation, Armonk, NY (US)

(72) Inventors: Karan Ahuja, Bangalore (IN); Ruchika Banerjee, New Delhi (IN); Kuntal Dey, New Delhi (IN); Seema Nagar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 15/096,667

(22) Filed: Apr. 12, 2016

(65) Prior Publication Data

US 2017/0293353 A1    Oct. 12, 2017

(51) Int. Cl.
*G06F 3/01* (2006.01)
*G06F 3/00* (2006.01)
(Continued)

(52) U.S. Cl.
CPC ............. *G06F 3/013* (2013.01); *G06F 3/012* (2013.01); *G06K 9/0061* (2013.01); *G06F 3/005* (2013.01); *G06K 9/4604* (2013.01)

(58) Field of Classification Search
CPC .......... G06F 3/012; G06F 3/013; G06F 3/005; G06K 9/0061; G06K 9/4604
See application file for complete search history.

(56) References Cited

U.S. PATENT DOCUMENTS

| 5,912,721 A | 6/1999 | Yamaguchi et al. |
| 7,643,659 B2 | 1/2010 | Cao et al. |

(Continued)

FOREIGN PATENT DOCUMENTS

| EP | 1583035 A2 | 10/2005 |
| WO | 02/09025 A1 | 1/2002 |

OTHER PUBLICATIONS

Ko et al., Facial Feature Tracking and Head Orientation-based Gaze Tracking, http://www.umiacs.umd.edu/ Nov. 2, 2005.
(Continued)

*Primary Examiner* — Darlene M Ritchie
(74) *Attorney, Agent, or Firm* — Ryan, Mason & Lewis, LLP

(57) ABSTRACT

Methods, systems, and computer program products for gaze point detection using dynamic facial reference points under varying lighting conditions are provided herein. A computer-implemented method includes detecting items of spatial information pertaining to at least one eye of an individual gazing at one or more objects; detecting an item of spatial information pertaining to at least one nostril of the individual; detecting items of spatial information pertaining to the head of the individual; assigning a distinct weight to each of (i) the spatial information pertaining to the at least one eye and (ii) the spatial information pertaining to the at least one nostril based on the spatial information pertaining to the head; and generating gaze detection parameters applicable to the individual based on (i) the weighted spatial information pertaining to the at least one eye and (ii) the weighted spatial information pertaining to the at least one nostril.

20 Claims, 3 Drawing Sheets

(51) Int. Cl.
  *G06K 9/00* (2006.01)
  *G06K 9/46* (2006.01)

(56) References Cited

U.S. PATENT DOCUMENTS

| | | | |
|---|---|---|---|
| 8,224,035 B2 | 7/2012 | Adachi et al. | |
| 8,331,630 B2 | 12/2012 | Nakanishi et al. | |
| 8,509,541 B2 | 8/2013 | Tallamraju et al. | |
| 8,577,099 B2 | 11/2013 | Li et al. | |
| 8,878,749 B1 * | 11/2014 | Wu | G01S 17/06 345/8 |
| 8,885,888 B2 | 11/2014 | Higuchi et al. | |
| 9,182,819 B2 | 11/2015 | Strupczewski et al. | |
| 2009/0225278 A1 * | 9/2009 | Chen | A61B 3/113 351/210 |
| 2013/0063596 A1 * | 3/2013 | Ueda | B60R 16/02 348/148 |
| 2014/0218281 A1 | 8/2014 | Amayeh et al. | |
| 2014/0320691 A1 | 10/2014 | Zhu et al. | |
| 2015/0002392 A1 * | 1/2015 | Kempinski | A61B 3/113 345/156 |
| 2015/0123967 A1 * | 5/2015 | Quinn | G06T 13/40 345/420 |
| 2015/0145777 A1 * | 5/2015 | He | G06K 9/0061 345/158 |
| 2015/0154758 A1 * | 6/2015 | Nakazawa | A61B 3/113 382/103 |
| 2016/0063303 A1 * | 3/2016 | Cheung | A61B 3/113 382/103 |
| 2016/0139665 A1 * | 5/2016 | Lopez | G06F 3/013 345/156 |
| 2016/0198091 A1 * | 7/2016 | Edwards | G06F 3/013 348/78 |
| 2016/0232399 A1 * | 8/2016 | Kempinski | G06K 9/0061 |
| 2016/0364609 A1 * | 12/2016 | Ivanisov | G06K 9/00604 |
| 2016/0378180 A1 * | 12/2016 | Theytaz | G06F 3/013 345/8 |
| 2017/0099433 A1 * | 4/2017 | Cleveland | H04N 5/23219 |
| 2017/0206694 A1 * | 7/2017 | Jiao | G06T 13/40 |
| 2017/0287112 A1 * | 10/2017 | Stafford | G06T 5/00 |

OTHER PUBLICATIONS

Yang et al., Eye Localization through Multiscale Sparse Dictionaries, IEEE International Conference on Automatic Face and Gesture Recognition, Santa Barbara, Mar. 2011.

Valenti et al., Accurate eye center location and tracking using isophote curvature. In Proceedings of the CVPR, pp. 1-8, 2008.

Yi et al, "A robust eye localization method for low quality face images," in Proceedings of the International Joint Conference on Biometrics (IJCB '11), pp. 1-6, Washington, DC, USA, Oct. 2011.

Jariwala et al., "Performance Analysis of Eye localization Methods for Real Time Vision Interface using Low Grade Video Camera." International Journal of Computer Applications 114.2 (2015).

Xu et al., "Semantic feature extraction for accurate eye corner detection." Pattern Recognition, 2008. ICPR 2008. 19th International Conference on. IEEE, 2008.

Zheng et al., "A robust method for eye features extraction on color image." Pattern Recognition Letters 26.14 (2005): 2252-2261.

Haiying et al., "A novel method for eye corner detection based on weighted variance projection function." Image and Signal Processing, 2009. CISP'09. 2nd International Congress on. IEEE, 2009.

Ebisawa, Y. "Head pose detection with one camera based on pupil and nostril detection technique." Virtual Environments, Human-Computer Interfaces and Measurement Systems, 2008. VECIMS 2008. IEEE Conference on. IEEE, 2008.

* cited by examiner

GAZE POINT DETECTION USING DYNAMIC FACIAL REFERENCE POINTS UNDER VARYING LIGHTING CONDITIONS

FIELD

The present application generally relates to information technology, and, more particularly, to gaze behavior data management.

BACKGROUND

Eye gaze tracking refers to detecting a point in a given space at which an observer (such as a human) is looking. However, detecting eye gaze points with accuracy and under varying conditions presents multiple challenges. For example, with respect to implementation contexts such as with mobile devices and/or in retail settings, considerable variance occurs (such as varying backgrounds, varying lighting conditions, etc.), and existing gaze detection approaches fail to achieve sufficient accuracy objectives.

SUMMARY

In one embodiment of the present invention, techniques for gaze point detection using dynamic facial reference points under varying lighting conditions are provided. An exemplary computer-implemented method can include detecting one or more items of spatial information pertaining to at least one eye of an individual gazing at one or more objects, detecting at least one item of spatial information pertaining to at least one nostril of the individual, and detecting one or more items of spatial information pertaining to the head of the individual. Such a method can also include assigning a distinct weight to each of (i) the one or more items of spatial information pertaining to at least one eye of the individual and (ii) the at least one item of spatial information pertaining to at least one nostril of the individual based on the one or more items of spatial information pertaining to the head of the individual. Further, such a method can additionally include generating one or more gaze detection parameters applicable to the individual based on (i) the weighted one or more items of spatial information pertaining to at least one eye of the individual and (ii) the weighted at least one item of spatial information pertaining to at least one nostril of the individual.

In another embodiment of the invention, an exemplary computer-implemented method can include detecting spatial information pertaining to eye center localization of at least one eye of an individual gazing at one or more objects, and detecting spatial information pertaining to eye corner position of at least one eye of the individual. Such a method can also include detecting spatial information pertaining to positioning of at least one nostril of the individual, detecting spatial information pertaining to the head of the individual. Additionally, such a method can include assigning a distinct weight to each of (i) the spatial information pertaining to eye center localization, (ii) the spatial information pertaining to eye corner position, and (iii) the spatial information pertaining to positioning of at least one nostril based on the spatial information pertaining to the head of the individual, as well as detecting the current status of one or more lighting variables arising from an area proximate to the individual. Further, such a method can also include generating one or more gaze detection parameters applicable to the individual based on (i) the weighted spatial information pertaining to eye center localization, (ii) the weighted spatial information pertaining to eye corner position, (iii) the weighted spatial information pertaining to positioning of at least one nostril based on the spatial information pertaining to the head of the individual, and (iv) the current status of the one or more lighting variables.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for gaze point detection using dynamic facial reference points under varying lighting conditions. By way of example, one or more embodiments of the invention can include detecting gaze data arising from an individual while significantly nullifying head movements of the individual.

Additionally, at least one embodiment of the invention can include implementing a dynamic and adaptive system for shifting facial reference points and parameters based on head pose(s) and mobile sensor inputs, wherein such a system can detect gaze points under varying lighting conditions.

Figure 1:
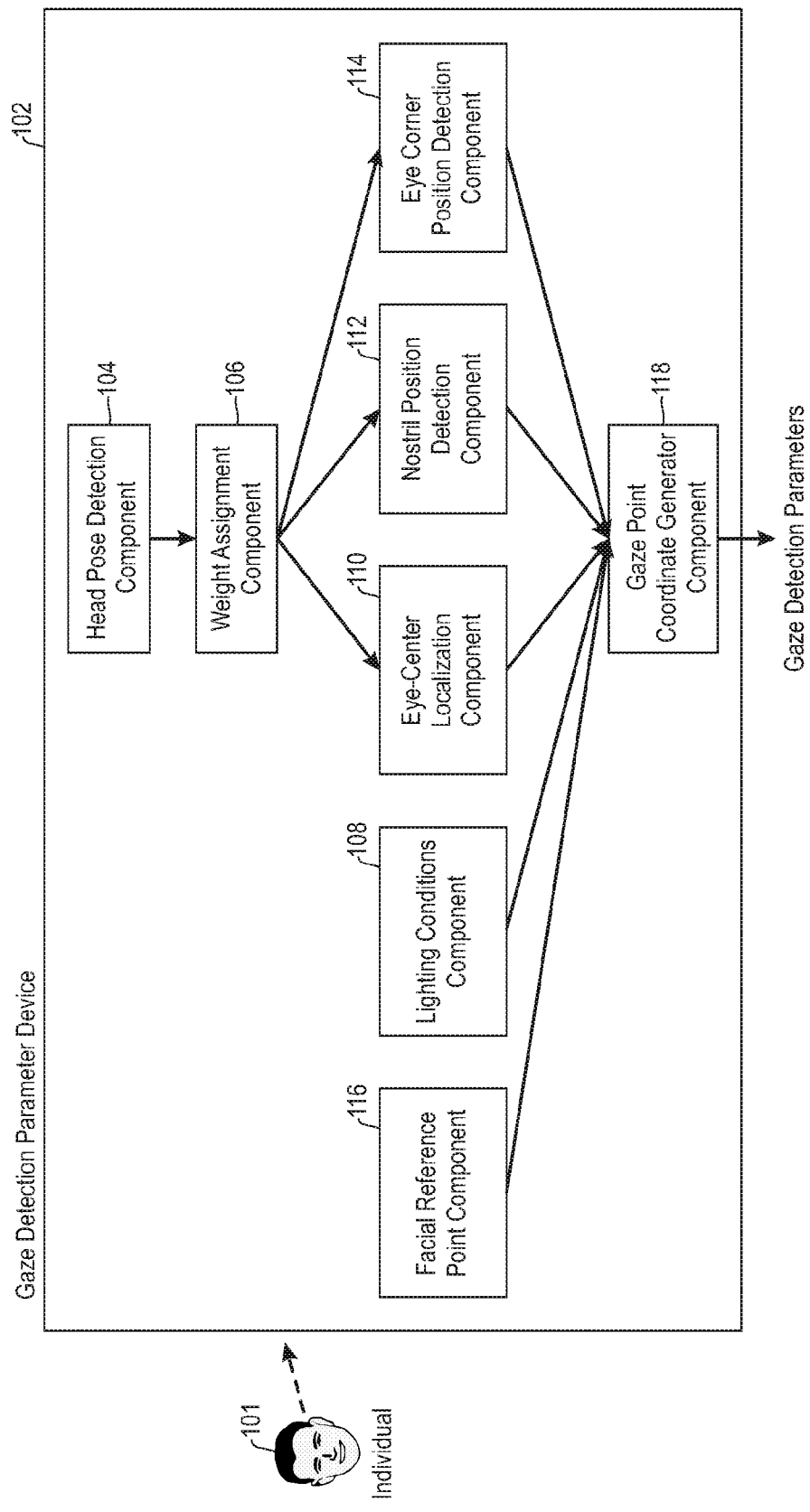
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a gaze detection parameter device 102, which includes a head pose detection component 104, a weight assignment component 106, a lighting conditions component 108, an eye center localization component 110, a nostril position detection component 112, and an eye corner position detection component 114. In one or more embodiments of the invention, a light monitoring sensor/component (such as component 108) can be resident on the gaze detection parameter device 102, and in one or more alternative embodiments of the invention, a light monitoring sensor/component (such as component 108) can be a separate device that transmits lighting condition data to the gaze detection parameter device 102.

As further detailed herein, and based on gaze information arising from an individual 101, the eye center localization component 110 detects eye center localization (for example, using one or more inward gradient vectors) data for the individual 101, the nostril position detection component 112 detects a nostril position of the individual 101, and the eye corner position detection component 114 detects an eye corner position, with respect to caruncle, of one or more of the individual's eyes. In one or more embodiments of the invention, components 110, 112, and 114 can make the noted detections of the eye and nostril positions by implementing one or more detection algorithms (as further detailed herein) in conjunction with a camera (such as a camera resident on a mobile phone). The eye corner, for example, can act as a facial reference point in a gaze tracking system.

The gaze detection parameter system 102 subsequently identifies and/or determines a facial reference point of the individual 101 using a combination of the position of eyes and nostrils (via data from components 110, 112 and 114). Additionally, one or more embodiments of the invention can also include identifying and/or determining a facial reference point of the individual 101 using a combination of the position of eyes and nostrils (via data from components 110, 112 and 114) with respect to varying head poses and/or positions of the individual 101 (as detected via component 104) as well as under varying lighting conditions (as detected via component 108).

Determining a specific combination of nostril and eye reference points can be carried out by assigning a distinct weight to each of (i) the detected eye center localization data for the individual 101, (ii) the detected nostril position of the individual 101, and (iii) the detected eye corner position of the individual 101 based on the current head pose of the user 101. Head poses can include indications and/or measurements pertaining to an upward inclination of the head, a downward inclination of the head, a leftward inclination of the head, and/or a rightward inclination of the head. Further, at least one embodiment of the invention can include detecting a head pose of the individual 101 (via component 104) and dynamically updating reference point weights applied to (i) the detected eye center localization data for the individual 101, (ii) the detected nostril position of the individual 101, and (iii) the detected eye corner position of the individual 101 based upon the detected head pose. Such an embodiment can also include significantly nullifying against inadvertent head movements of the individual 101 using a head pose detection algorithm (as further described herein).

As also depicted in FIG. 1, at least one embodiment of the invention includes monitoring and/or detecting varying light conditions (within the surroundings and/or context of the individual 101) using one or more light sensors embedded in the device 102 and/or using one or more mobile/remote sensors (such as light-dependent resistor (LDR) photocell sensors, for example). By way merely of illustration, a significant challenge in existing eye detection approaches includes the effects of glints of light and/or reflections. As light conditions change, the effect of a glint of light and/or reflection can also change. Accordingly, at least one embodiment of the invention includes overcoming such challenges by determining the angle in which the head of an observer is turned/tilted (which can be carried out via component 104 in FIG. 1, for example), as well as determining where within that detected head is the eye center (which can be carried out via component 110 in FIG. 1, for example). Additionally, for example, the nostril and eye corner positions can be determined and used as reference points under bright light conditions for detection, and in such instances, only these points are tracked. In moderate lighting conditions, by way of further example, a continuous detection can be carried out, and in low-lighting conditions, additional filters can be implemented.

Accordingly, as depicted in FIG. 1, one or more embodiments of the invention include determining and/or generating dynamic and adaptive shifting facial reference points and parameters for gaze detection via component 118 based on the inputs received from a facial reference point component 116 (which generates, as output, any change of facial reference points based on input from component 104), the lighting conditions component 108, as well as from the eye center localization component 110 (weighted via component 106), the nostril position detection component 112 (weighted via component 106), and the eye corner position detection component 114 (weighted via component 106). The parameters generated as the output of device 102 can include the gaze points, described by x, y and z coordinate points on the projected plane. Accordingly, in one or more embodiments of the invention, the change of facial reference points, generated by component 116, is combined with the output of component 108 as well as the weighted outputs of components 110, 112 and 114, and provided to the gaze point coordinate generator component 118, which in turn determines the x, y and z coordinate points of the gaze as the final output.

In an example embodiment of the invention, device 102 can be implemented via and/or resident in a mobile device setting, for example, in a mobile device that includes sensors and a camera.

In one or more embodiments of the invention, eye corner detection, such as carried out via component 114, can include the following steps. The face of the individual (such as 101) can be detected from an image using, for example, the Viola-Jones algorithm. Adaptive skin color thresholding can be applied to remove homogenous regions to improve computational complexity. The value of the thresholds used can depend, for example, on the lighting conditions. The eye region of interest can be identified and/or extracted from the image, and the approximate eye corner region of interest can be extracted from the eye region.

Additionally, the caruncle can be detected in the image and, accordingly, the eye corner can be extracted as follows. Homography is identified and/or detected between the caruncle and the eye corner region of interest. In one or more embodiments of the invention, the caruncle will be slightly pink and/or red colored and will have a circular arced shape. Subsequently, image gradients can be calculated, which will be positioned radially outwards at the periphery of the caruncle at the points at which the caruncle meets the sclera. The point of maximum intersection of such gradients can then be determined, and this point of maximum intersection can be identified and/or utilized as the eye corner.

In one or more embodiments of the invention, nostril detection, such as carried out by component 112, can include the following steps. The face of the individual (such as 101) can be detected from an image using, for example, the Viola-Jones algorithm. Adaptive skin color thresholding can be applied to remove homogenous regions to improve computational complexity. The value of the thresholds used can depend, for example, on the lighting conditions. The nostril region of interest can then be extracted from the face portion of the image, and the center of the nostril can be identified using a weighted gradient dot product approach. Generally, the nostril will be black in color and circular/elliptical in shape. Accordingly, a center localization approach, in which the gradients of a darker region within a lighter region will be positioned radially outwards, can be used. In such an embodiment, after skin color thresholding, the nostril will be a black circle on a white background.

Using such an approach, at least one embodiment of the invention can include identifying the center of the nostril by extending vectors from the probable center to the periphery of the circle (circular shape) where the vectors will be positioned radially outwards. Additionally, a weight can be added to black regions within a particular radius to identify the nostril.

Also, in one or more embodiments of the invention, pseudo-code of an eye center localization algorithm can include the following. The center $c^*$ of a circular object in an image with pixel positions $p_i$, $i \in \{1, \ldots, N\}$ is given by the following equation:

$$c^* = \underset{c}{\operatorname{argmax}} \frac{1}{N} \sum_{i=1}^{N} \frac{(w_c + f(w_p))}{f(d)} (d_i^T g_i)^2.$$

The translation of that equation to pseudo-code includes the following:

```
For i = 1:N // iterating for all pixel positions;
For c ∈ C such that norm(c − p_i) ≤ R // test for each possible center;
d_i = (p_i − c) / |(p_i − c)| // normalized displacement vector;
g_i = (∂I(x_i, y_i) / ∂ x_i, ∂ I(x_i, y_i) / ∂ y_i)^T // normalized gradient vector;
if(norm(c − p_i) ≤ r),f(w_p) = w_pi;
else f(w_p) = 0;
f(d)= CDF(norm(c − p_i)) such that f(d) ∝ |c − p_i|;
dotProduct = (d_i * g_i)^2;
c* ∈ output = ((w_c + f(w_p)) / f(d)) * dotProduct;
end for;
``` optimalCenter=arg$_c$max((1/$N$)*(output)); wherein $w_x$=the weightage given to dark points (this weightage can be reduced in darker conditions to avoid false positives), R=the radius value for considering points within the eye region, r=the radius value for considering points within the iris, and $f(d)$=CDF(norm(c−p)) such that $f(d)$ is smaller for points within the iris and greater for those points outside of the iris. This is because points closer to the pupil should have greater weightage to the detection, as the probability of finding the pupil is greater for the points in the vicinity of the iris than those further away from the iris. Additionally, the pupil may not always be the darkest point, but the iris will always be the darkest annulus. Therefore, functions $f(d)$ and $f(w_p)$ are implemented to accurately detect eye center localization.

A cumulative distribution function (CDF), as used in one or more embodiments of the invention, can also depend on the intensity of the pixels of the eye, which in turn depend on the intensity of surrounding lighting conditions. Weightage given to dark points can also depend on the lighting conditions, wherein a high weightage can be applied under high lighting intensity.

As detailed herein, one or more embodiments of the invention include determining and/or generating one or more stable reference points to be used in measuring the direction of a gaze vector for a particular individual, as the position of the individual's face can change with respect to the frame. Such reference points can include, as illustrated herein, fixed facial anchor points from which eye movements can be measured. Accordingly, by taking a facial reference point as well as the displacement of the pupil with respect to the reference point rather than that of the frame, at least one embodiment of the invention can include nullifying inadvertent head movements.

Also, one or more embodiments of the invention include changing and/or modifying such reference points based on a change of the pose of the individual's head. For example, when the individual is looking upwards, the reference point can be changed to the individual's nostril. When the individual is looking down, the reference point can be changed, for example, to the eye corner of the individual. Additionally, for example, when the individual is looking right, the left nostril and the left eye corner can be used as reference points (and the opposite nostril and eye corner can be used if the individual is looking left). If the individual is wearing glasses, for instance, at least one embodiment of the invention can include avoiding detection of the eye corner, as the eye corner may be occluded. Rather, in such an instance, at least one embodiment of the invention can include using the middle of the spectacle/glasses as the reference point. Further, one or more embodiments of the invention can include assigning distinct weights to different levels (that is, heights) of the individual looking up, looking down, looking left and/or looking right, and utilizing confidence scores of the detected gaze using methods for interpolating and detecting the actual gaze point. By way of example, if nostril positioning and eye corner positioning are separately used to detect a head pose (in addition to eye center), it can be determined where the individual is looking. Additionally, one or more embodiments of the invention can include interpolating between these positioning techniques with dynamic weights.

Such a dynamic changing of a reference point can be particularly important within the context of mobile devices (such as phones and tablets) because the field of view of a front camera of such a device is comparatively less than that of a desktop device, and hence, the calculation of the reference point may need to be more accurate.

Using a light sensor, such as found commonly in mobile devices, at least one embodiment of the invention can include detecting and subsequently changing the following items. In the case of ideal light conditions, such an embodiment can include detecting and subsequently tracking the eye center and one or more reference points, instead of continuous detection, as the accuracy loss would likely not be profound. In the case of moderate lighting conditions, such an embodiment can include carrying out continuous detection, and changing parameters for adaptive skin color thresholding for nostril and eye corner detection, as well as changing weight and CDF parameters for eye center localization. In the case of low lighting and/or dim conditions, such an embodiment can include normalizing the image by applying contrast limited adaptive histogram equalization (CLAHE), and performing continuous detection. In such conditions, such an embodiment can also include changing parameters for adaptive skin color thresholding for nostril and eye corner detection, and changing weight and CDF parameters for eye center localization.

When tracking gaze data, at least one embodiment of the invention can include compensating for angle changes in the camera, based on the changes in z-direction, using one or more three-dimensional (3-D) localization algorithms. By way of example, the head pose can be detected, which happens to change in terms of angles if the individual turns his or her head in different directions. This detection can also be combined with the detected eye center to determine the point at which the person is looking. Additionally, in one or more embodiments of the invention, a proximity sensor can be used to track the distance of the individual's face from the camera. Further, if a very bright light source is detected, the pupil of the individual's eye may not be the darkest point, and in those cases, at least one embodiment of the invention can include implementing inward gradients in the eye center localization process.

Figure 2:
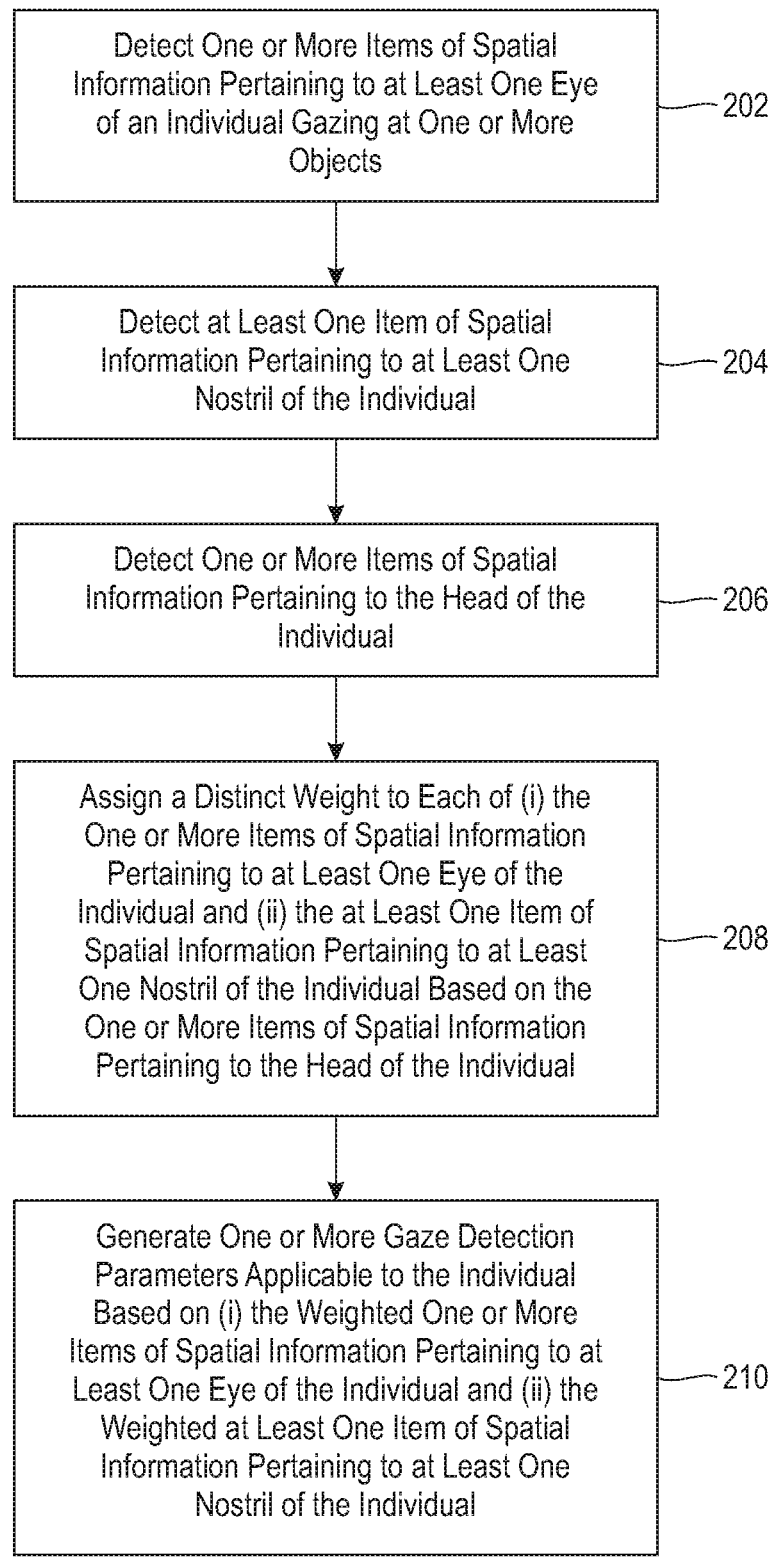
FIG. 2 is a flow diagram illustrating techniques, according to an embodiment of the invention.

FIG. 2 is a flow diagram illustrating techniques according to an embodiment of the present invention. Step 202 includes detecting one or more items of spatial information pertaining to at least one eye of an individual gazing at one or more objects. The one or more items of spatial information pertaining to the at least one eye of the individual can include an eye center localization measurement. Additionally, the one or more items of spatial information pertaining to the at least one eye of the individual can include an eye corner position measurement. Such an eye corner position measurement can be made with respect to a caruncle.

Step 204 includes detecting at least one item of spatial information pertaining to at least one nostril of the individual. The one or more items of spatial information pertaining to the at least one nostril can include a nostril position measurement.

Step 206 includes detecting one or more items of spatial information pertaining to the head of the individual. The one or more items of spatial information pertaining to the head of the individual can include a measurement of an upward inclination of the head of the individual, a measurement of a downward inclination of the head of the individual, a measurement of a leftward inclination of the head of the individual, and/or a measurement of a rightward inclination of the head of the individual.

Step 208 includes assigning a distinct weight to each of (i) the one or more items of spatial information pertaining to at least one eye of the individual and (ii) the at least one item of spatial information pertaining to at least one nostril of the individual based on the one or more items of spatial information pertaining to the head of the individual.

Step 210 includes generating one or more gaze detection parameters applicable to the individual based on (i) the weighted one or more items of spatial information pertaining to at least one eye of the individual and (ii) the weighted at least one item of spatial information pertaining to at least one nostril of the individual. The one or more gaze detection parameters can include one or more facial reference points of the individual.

Also, an additional embodiment of the invention includes detecting spatial information pertaining to eye center localization of at least one eye of an individual gazing at one or more objects, and detecting spatial information pertaining to eye corner position of at least one eye of the individual. Such an embodiment can also include detecting spatial information pertaining to positioning of at least one nostril of the individual, detecting spatial information pertaining to the head of the individual. Additionally, such an embodiment can include assigning a distinct weight to each of (i) the spatial information pertaining to eye center localization, (ii) the spatial information pertaining to eye corner position, and (iii) the spatial information pertaining to positioning of at least one nostril based on the spatial information pertaining to the head of the individual, as well as detecting the current status of one or more lighting variables arising from an area proximate to the individual. Further, such an embodiment can also include generating one or more gaze detection parameters applicable to the individual based on (i) the weighted spatial information pertaining to eye center localization, (ii) the weighted spatial information pertaining to eye corner position, (iii) the weighted spatial information pertaining to positioning of at least one nostril based on the spatial information pertaining to the head of the individual, and (iv) the current status of the one or more lighting variables.

Additionally, wherein the current status of the one or more lighting variables includes an amount of brightness predetermined as ideal lighting conditions, such an embodiment of the invention can include generating an instruction to track (i) the detected spatial information pertaining to eye center localization of the at least one eye of the individual, (ii) the detected spatial information pertaining to eye corner position of the at least one eye of the individual, (iii) the detected spatial information pertaining to positioning of the at least one nostril of the individual, and (iv) the detected spatial information pertaining to the head of the individual. Also, wherein the current status of the one or more lighting variables includes an amount of brightness predetermined as moderate lighting conditions, such an embodiment of the invention can include generating an instruction to continuously detect, over a given period of time, (i) spatial information pertaining to eye center localization of the at least one eye of the individual, (ii) spatial information pertaining to eye corner position of the at least one eye of the individual, (iii) spatial information pertaining to positioning of the at least one nostril of the individual, and (iv) spatial information pertaining to the head of the individual.

Further, wherein the current status of the one or more lighting variables includes an amount of brightness predetermined as dim lighting conditions, such an embodiment of the invention can include normalizing an image capturing the individual gazing at the one or more objects and generating an instruction to continuously detect, over a given period of time, (i) spatial information pertaining to eye center localization of the at least one eye of the individual, (ii) spatial information pertaining to eye corner position of the at least one eye of the individual, (iii) spatial information pertaining to positioning of the at least one nostril of the individual, and (iv) spatial information pertaining to the head of the individual.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
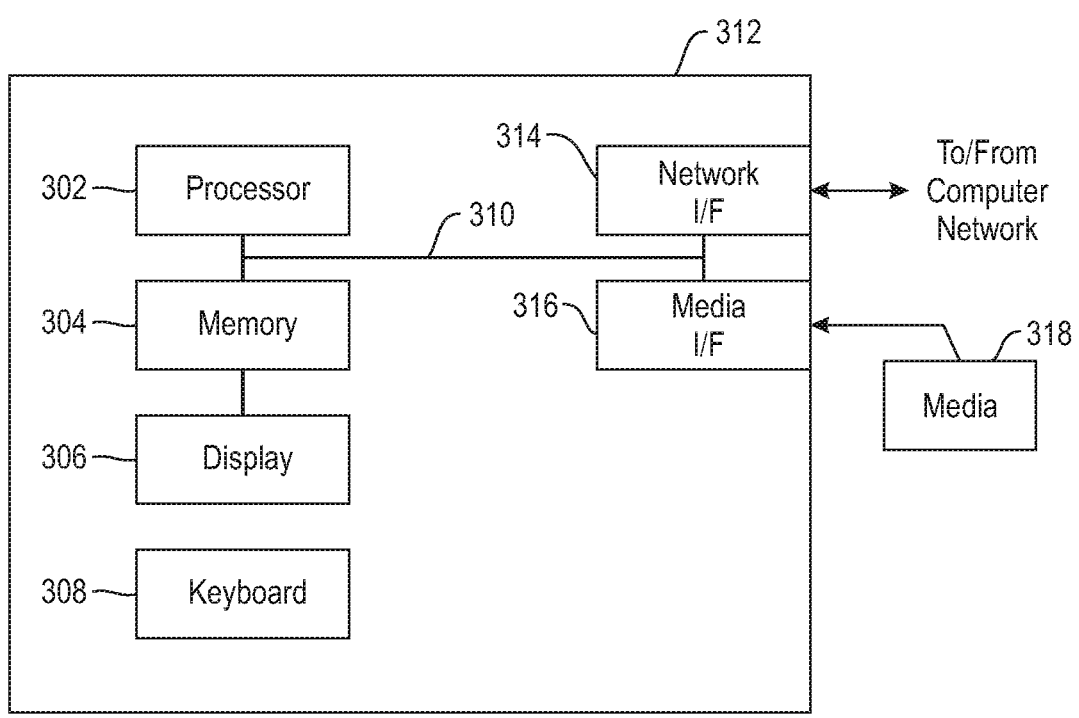
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment (such as, for example, a cloud computing environment). Rather, embodiments of the present invention are capable of being implemented in conjunction with any type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, detecting eye corner position with respect to caruncle, and/or dynamically shifting facial reference points based on weights assigned with respect to a current head position of the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting, from an image, a face of an individual gazing at one or more objects;
    removing one or more homogenous regions from the detected face by applying adaptive skin color thresholding to the image;
    detecting one or more items of spatial information pertaining to at least one eye of the individual;
    detecting at least one item of spatial information pertaining to at least one nostril of the individual;
    detecting one or more items of spatial information pertaining to the head of the individual;
    assigning a distinct weight to each of (i) the one or more items of spatial information pertaining to at least one eye of the individual and (ii) the at least one item of spatial information pertaining to at least one nostril of the individual based on the one or more items of spatial information pertaining to the head of the individual;
    detecting the current status of one or more lighting variables arising from an area proximate to the individual;
    updating, based on the detected status of the one or more lighting variables, the distinct weight assigned to each of (i) the one or more items of spatial information pertaining to at least one eye of the individual and (ii) the at least one item of spatial information pertaining to at least one nostril of the individual; and
    generating one or more gaze detection parameters applicable to the individual based on (i) the weighted one or more items of spatial information pertaining to at least one eye of the individual and (ii) the weighted at least one item of spatial information pertaining to at least one nostril of the individual, wherein said generating comprises:
        generating an instruction to continuously detect, over a given period of time, (i) spatial information pertaining to the at least one eye of the individual, (ii) spatial information pertaining to the at least one nostril of the individual, and (iii) spatial information pertaining to the head of the individual;
    wherein the steps are carried out by at least one computing device.

2. The computer-implemented method of claim 1, wherein the one or more items of spatial information pertaining to the at least one eye of the individual comprise an eye center localization measurement.

3. The computer-implemented method of claim 1, wherein the one or more items of spatial information pertaining to the at least one nostril comprises a nostril position measurement.

4. The computer-implemented method of claim 1, wherein the one or more items of spatial information pertaining to the head of the individual comprises a measurement of an upward inclination of the head of the individual.

5. The computer-implemented method of claim 1, wherein the one or more items of spatial information pertaining to the head of the individual comprises a measurement of a downward inclination of the head of the individual.

6. The computer-implemented method of claim 1, wherein the one or more items of spatial information pertaining to the head of the individual comprises a measurement of a leftward inclination of the head of the individual.

7. The computer-implemented method of claim 1, wherein the one or more items of spatial information pertaining to the head of the individual comprises a measurement of a rightward inclination of the head of the individual.

8. The computer-implemented method of claim 1, wherein the one or more gaze detection parameters comprise one or more facial reference points of the individual.

9. The computer-implemented method of claim 1, wherein the one or more items of spatial information pertaining to the at least one eye of the individual comprise an eye corner position measurement.

10. The computer-implemented method of claim 9, wherein the eye corner position measurement is made with respect to a caruncle.

11. A computer program product comprising a non-transitory computer readable storage medium having program instructions embodied therewith, the program instructions executable by a device to cause the device to:
detect, from an image, a face of an individual gazing at one or more objects;
remove one or more homogenous regions from the detected face by applying adaptive skin color thresholding to the image;
detect one or more items of spatial information pertaining to at least one eye of the individual;
detect at least one item of spatial information pertaining to at least one nostril of the individual;
detect one or more items of spatial information pertaining to the head of the individual;
assign a distinct weight to each of (i) the one or more items of spatial information pertaining to at least one eye of the individual and (ii) the at least one item of spatial information pertaining to at least one nostril of the individual based on the one or more items of spatial information pertaining to the head of the individual;
detect the current status of one or more lighting variables arising from an area proximate to the individual;
update, based on the detected status of the one or more lighting variables, the distinct weight assigned to each of (i) the one or more items of spatial information pertaining to at least one eye of the individual and (ii) the at least one item of spatial information pertaining to at least one nostril of the individual; and
generate one or more gaze detection parameters applicable to the individual based on (i) the weighted one or more items of spatial information pertaining to at least one eye of the individual and (ii) the weighted at least one item of spatial information pertaining to at least one nostril of the individual, wherein said generating comprises:
generating an instruction to continuously detect, over a given period of time, (i) spatial information pertaining to the at least one eye of the individual, (ii) spatial information pertaining to the at least one nostril of the individual, and (iii) spatial information pertaining to the head of the individual.

12. A system comprising:
a memory; and
at least one processor coupled to the memory and configured for:
detecting, from an image, a face of an individual gazing at one or more objects;
removing one or more homogenous regions from the detected face by applying adaptive skin color thresholding to the image;
detecting one or more items of spatial information pertaining to at least one eye of the individual;
detecting at least one item of spatial information pertaining to at least one nostril of the individual;
detecting one or more items of spatial information pertaining to the head of the individual;
assigning a distinct weight to each of (i) the one or more items of spatial information pertaining to at least one eye of the individual and (ii) the at least one item of spatial information pertaining to at least one nostril of the individual based on the one or more items of spatial information pertaining to the head of the individual;
detecting the current status of one or more lighting variables arising from an area proximate to the individual;
updating, based on the detected status of the one or more lighting variables, the distinct weight assigned to each of (i) the one or more items of spatial information pertaining to at least one eye of the individual and (ii) the at least one item of spatial information pertaining to at least one nostril of the individual; and
generating one or more gaze detection parameters applicable to the individual based on (i) the weighted one or more items of spatial information pertaining to at least one eye of the individual and (ii) the weighted at least one item of spatial information pertaining to at least one nostril of the individual, wherein said generating comprises:
generating an instruction to continuously detect, over a given period of time, (i) spatial information pertaining to the at least one eye of the individual, (ii) spatial information pertaining to the at least one nostril of the individual, and (iii) spatial information pertaining to the head of the individual.

13. A computer-implemented method, comprising:
detecting, from an image, a face of an individual gazing at one or more objects;
removing one or more homogenous regions from the detected face by applying adaptive skin color thresholding to the image;
detecting spatial information pertaining to eye center localization of at least one eye of the individual;
detecting spatial information pertaining to eye corner position of at least one eye of the individual;
detecting spatial information pertaining to positioning of at least one nostril of the individual;
detecting spatial information pertaining to the head of the individual;
assigning a distinct weight to each of (i) the spatial information pertaining to eye center localization, (ii) the spatial information pertaining to eye corner position, and (iii) the spatial information pertaining to positioning of at least one nostril based on the spatial information pertaining to the head of the individual;

detecting the current status of one or more lighting variables arising from an area proximate to the individual;

updating, based on the detected status of the one or more lighting variables, the distinct weight assigned to each of (i) the spatial information pertaining to eye center localization, (ii) the spatial information pertaining to eye corner position, and (iii) the spatial information pertaining to positioning of at least one nostril; and generating one or more gaze detection parameters applicable to the individual based on (i) the weighted spatial information pertaining to eye center localization, (ii) the weighted spatial information pertaining to eye corner position, and (iii) the weighted spatial information pertaining to positioning of at least one nostril based on the spatial information pertaining to the head of the individual, wherein said generating comprises:

generating an instruction to continuously detect, over a given period of time, (i) spatial information pertaining to eye center localization of the at least one eye of the individual, (ii) spatial information pertaining to eye corner position of the at least one eye of the individual, (iii) spatial information pertaining to positioning of the at least one nostril of the individual, and (iv) spatial information pertaining to the head of the individual;

wherein the steps are carried out by at least one computing device.

14. The computer-implemented method of claim 13, wherein the spatial information pertaining to the head of the individual comprises a measurement of an upward inclination of the head of the individual.

15. The computer-implemented method of claim 13, wherein the spatial information pertaining to the head of the individual comprises a measurement of a downward inclination of the head of the individual.

16. The computer-implemented method of claim 13, wherein the spatial information pertaining to the head of the individual comprises a measurement of a leftward inclination of the head of the individual.

17. The computer-implemented method of claim 13, wherein the spatial information pertaining to the head of the individual comprises a measurement of a rightward inclination of the head of the individual.

18. The computer-implemented method of claim 13, wherein the current status of the one or more lighting variables comprises an amount of brightness predetermined as a first set of lighting conditions, and wherein said generating comprises generating an instruction to track (i) the detected spatial information pertaining to eye center localization of the at least one eye of the individual, (ii) the detected spatial information pertaining to eye corner position of the at least one eye of the individual, (iii) the detected spatial information pertaining to positioning of the at least one nostril of the individual, and (iv) the detected spatial information pertaining to the head of the individual.

19. The computer-implemented method of claim 13, wherein the current status of the one or more lighting variables comprises an amount of brightness predetermined as a second set of lighting conditions, and wherein said generating comprises generating an instruction to continuously detect, over a given period of time, (i) spatial information pertaining to eye center localization of the at least one eye of the individual, (ii) spatial information pertaining to eye corner position of the at least one eye of the individual, (iii) spatial information pertaining to positioning of the at least one nostril of the individual, and (iv) spatial information pertaining to the head of the individual.

20. The computer-implemented method of claim 13, wherein the current status of the one or more lighting variables comprises an amount of brightness predetermined as dim lighting conditions, and wherein said generating comprises:

normalizing an image capturing the individual gazing at the one or more objects.

* * * * *